US009696880B2

(12) United States Patent
Monnig (10) Patent No.: US 9,696,880 B2
(45) Date of Patent: Jul. 4, 2017

(54) SCREEN MANAGEMENT SYSTEM (71) Applicant: INADEV CORPORATION, McLean, VA (US)

(72) Inventor: Benjamin Monnig, Renton, WA (US)

(73) Assignee: INADEV CORPORATION, McLean, VA (US)

(*) Notice: Subject to any disclaimer, the term of this patent is extended or adjusted under 35 U.S.C. 154(b) by 295 days.

(21) Appl. No.: 13/726,299

(22) Filed: Dec. 24, 2012

(65) Prior Publication Data

US 2013/0167078 A1 Jun. 27, 2013

Related U.S. Application Data (60) Provisional application No. 61/580,263, filed on Dec. 26, 2011.

(51) Int. Cl.
G06F 3/0484 (2013.01)

(52) U.S. Cl.
CPC .. G06F 3/0484 (2013.01); G06F 2203/04803 (2013.01)

(58) Field of Classification Search
USPC ......................................................... 715/800
See application file for complete search history.

(56) References Cited

U.S. PATENT DOCUMENTS

| 5,559,946 | A | * | 9/1996 | Porter | G06F 3/0481 715/777 |
| 5,561,757 | A |  | 10/1996 | Southgate | |
| 5,712,995 | A | * | 1/1998 | Cohn | 715/792 |
| 5,760,773 | A | * | 6/1998 | Berman et al. | 715/808 |
| 5,819,055 | A |  | 10/1998 | MacLean et al. | |
| 5,847,706 | A |  | 12/1998 | Kingsley | |
| 5,917,483 | A |  | 6/1999 | Duncan et al. | |
| 5,929,854 | A |  | 7/1999 | Ross | |
| 6,008,809 | A | * | 12/1999 | Brooks | 715/792 |
| 6,166,736 | A |  | 12/2000 | Hugh | |
| 6,310,631 | B1 |  | 10/2001 | Cecco et al. | |
| 6,313,854 | B1 |  | 11/2001 | Gibson | |
| 6,983,424 | B1 | * | 1/2006 | Dutta | 715/800 |
| 7,013,431 | B2 | * | 3/2006 | Taylor | G06F 3/0481 715/788 |
| 7,124,360 | B1 | * | 10/2006 | Drenttel | G06Q 30/00 715/205 |
| 7,149,982 | B1 |  | 12/2006 | Duperrouzel et al. | |
| 7,313,765 | B2 | * | 12/2007 | Taylor | G06F 3/0481 715/788 |
| 7,461,352 | B2 | * | 12/2008 | Katsuranis | G06F 3/011 715/800 |

(Continued)

OTHER PUBLICATIONS

Excerpt, Introducing Windows 95, copyright, 1995.*

(Continued)

Primary Examiner — Amy M Levy
(74) Attorney, Agent, or Firm — Mannava & Kang, P.C.

(57) ABSTRACT

A screen management system may receive a user input to divide a screen area and divide the screen area into a plurality of divided screen areas. A different application may be displayed in each of the divided screen areas. User input comprised of dragging a resizing bar in a direction is received and the plurality of divided screen areas are resized in response to the user input.

20 Claims, 6 Drawing Sheets

(56) References Cited

U.S. PATENT DOCUMENTS

| | | | | |
|---|---|---|---|---|
| 7,480,872 | B1* | 1/2009 | Ubillos | G06F 3/0483 715/716 |
| 7,636,899 | B2* | 12/2009 | Purcell | G06F 3/1431 345/634 |
| 7,694,233 | B1* | 4/2010 | Ording | G06F 3/0481 715/788 |
| 8,223,268 | B2* | 7/2012 | Fujiwara | G06F 3/0481 348/564 |
| 8,234,580 | B2 | 7/2012 | Bell et al. | |
| 8,356,258 | B2* | 1/2013 | Matthews | G06F 3/0481 345/684 |
| 8,527,907 | B2* | 9/2013 | Goshey | G06F 3/048 715/764 |
| 8,732,373 | B2* | 5/2014 | Sirpal | G06F 1/1632 710/303 |
| 8,930,847 | B2* | 1/2015 | Jeong | G06F 3/0481 715/781 |
| 2002/0180800 | A1* | 12/2002 | Taylor | G06F 3/0481 715/788 |
| 2010/0088634 | A1* | 4/2010 | Tsuruta et al. | 715/800 |
| 2010/0138767 | A1* | 6/2010 | Wang | G06F 3/0481 715/769 |
| 2010/0241989 | A1* | 9/2010 | Wen | 715/800 |
| 2010/0248788 | A1* | 9/2010 | Yook et al. | 455/566 |

OTHER PUBLICATIONS

Tomitsch "Trends and Evolution of Window Interfaces", Dec. 2003: See pp. 75-83 of chapter 5. <http://deco.inso.tuwien.ac.at/~martin/download/WindowInterfaces.pdf>.

Regan et al., "Bumping Windows between Monitors" Technical Report, MSR-TR-2003-13, Mar. 2003: See section 4.

Collaud, "A Distorted-View Approach to Assisting Web Navigation" See section 3. Download Date: Jan. 7, 2013. <http://diuf.unifr.ch/people/collaud/ContinuousZoom.html>.

Bury K. F., et al., "A tiled window management user interface for host dependent workstations", Jun. 1992, (IPCOM000108890D).

Bell, B. A. & Feiner, S. K. (Nov. 2000). Dynamic space management for user interfaces. Proceedings from UIST '00: 13th Annual ACM Symposium on User Interface Software and Technology, 2000. doi: 10.1145/354401.354790.

Cohen, E. S., Berman, A. M., Biggers, M. R., et al. (Mar. 1998). Automatic strategies in the Siemens RTL tiled window manager. Proceedings from COMWOR 1988: 2nd IEEE Conference on Computer Workstations, 1988. doi: 10.1109/COMWOR.1988.4808.

Luders et al. Research report: improving browsing in information by the automatic display layout. Proceedings of Visualization 1995 Conference, Oct. 1995: See sections 4 and 5.

Simkus. Application of an Intelligent Graphical Interface to Electronic Patient Records. Studies in Health Technology and Informatics, vol. 84, 2001: See abstract, figures 1-2, and pp. 691-692.

* cited by examiner

SCREEN MANAGEMENT SYSTEM

PRIORITY

The present application claims priority to U.S. provisional patent application Ser. No. 61/580,263, filed Dec. 26, 2011, which is incorporated by reference in its entirety.

BACKGROUND

Recently, mobile devices supporting mobility software and various other applications have come into widespread use. To support portability, a mobile device can have a limited size. Thanks to advances in display technology, screen sizes of mobile devices have been significantly increased. However, current operating systems for mobile devices may not provide and/or may not efficiently manage simultaneous display of applications from an end user operational standpoint.

BRIEF DESCRIPTION OF DRAWINGS

The embodiments are described in detail in the following description with reference to examples shown in the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a screen management system is operable to divide a screen area of a display into a plurality of divided screen areas and execute different applications in the divided screen areas. A screen area is a viewing area of a display of a device. The device is any device with a display. The device may include a processor or processing circuit that can run one or more applications. The device may include a mobile device, such as a cellular smartphone, laptop, tablet computer, or a stationary device, such as a desktop computer with a separate monitor connected to the computer or integrated in the housing of the computer. The applications that can be executed by the device are software applications. Examples of the applications may include a calculator, web browser, map application which may include navigation, word processor, spreadsheet, contact management, journal application, etc.

The journal application allows a user to create content and save it as a journal. The content may be comprised of handwritten notes, text, audio, video, images, documents, or other types of content. The user generated content may be stored as a journal and displayed on a divided screen area. A journal may be connected to another application and may be shared via email, SMS, or some other communication means, with other users. Journals can be shared by storing them on a shared storage system, such as a cloud storage system, and accessed by different users from the storage system. In one example of connecting user generated content in a journal to an application, a map application is opened and displayed on one divided screen area and a journal is opened and displayed on a second divided screen area simultaneously. In the journal, a user can make notes about a location shown in the map application and drag and drop a location or a "pin" shown in the map application into the journal. A link is saved in the journal between the location and the journal so when the journal is reopened the link is available to call the map application to display the location. For example, when the journal is viewed, the link may be displayed and clicked to show the location in the map application. Links can be created between a journal and other applications, such as URL that invokes the web browser application in a divided screen area next to the displayed journal, or a link to a spreadsheet that invokes a spreadsheet application in a divided screen area next to the displayed journal, and so on. In another example, a business card from a contact management application is dropped into a journal. Journals can be organized into folders and each journal may include one or more pages of content.

The screen management system also generates a resizing bar and a control area. The resizing bar allows a user to control the view area size of the divided screen areas. The control area allows a user to control which applications are executed in the divided screen areas and to share data items between applications running in the divided screen areas.

The resizing bar may include clickable tools such as pencil, eraser, highlighter, font, sticky note, media and lasso which can be used in the journal application and/or another application running in a divided screen area. These tools may be used for note-taking and selecting content (e.g., lassoing) to be saved and/or transferred between applications running in the divided screen areas.

The control area may be used to perform various functions for divided display areas. For example, icons may be shown for applications, such as a journal, web browser, map application, contact management application, calculator, etc. The icons may be selected to run an application in a divided screen area. The control area or the resizing bar may be used to store and exchange data items. The control area or the resizing bar may display a visual indicator, such as an icon, for each stored data item so it can be viewed and dragged and dropped into different applications in different divided screen areas.

The screen management system may be used for content creation and as a collaboration tool. Users can create content and share the content through the system. Also, the journal application facilitates collaboration between the users by allowing notes and other information to be created and modified by a group of users collaborating on the content.

Figure 1:
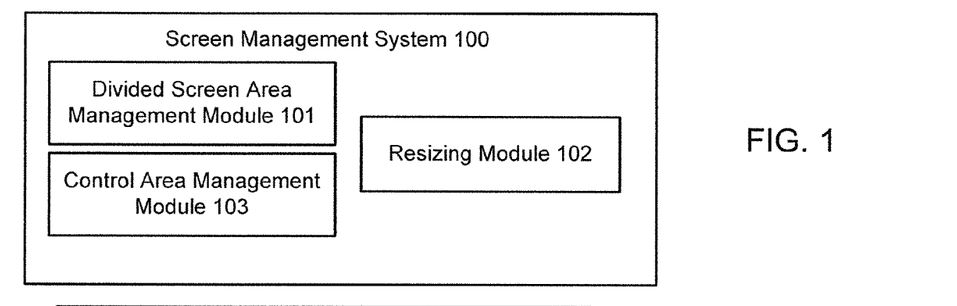
FIG. 1 illustrates a screen management system.

FIG. 1 illustrates a screen management system 100 including a divided screen area management module 101, a resizing module 102, and a control area management module 103. The divided screen area management module 101 generates a plurality of divided screen areas on a display. Each of the divided screen areas can display a different application. The divided screen area management module 101 can execute a selected application in a particular divided screen area selected by the user.

The resizing module 102 controls the resizing of divided screen areas currently displayed on the device. The resizing module 102 may receive user input to resize the divided screen areas, for example, via a resizing bar, which is described below, and resize the divided screen areas based on an amount selected by the user. The resizing module 102 may generate and display the resizing bar.

The resizing module 102 also resizes content displayed in the divided screen areas based on the resizing of the divided screen areas. For example, increasing size of content may include increasing text size or increasing size of an image displayed. The increase in content size may be proportional to the increase of the divided area screen size. For example, a percentage increase of the area of the divided screen area is determined, and the content size may be increased by the same percentage or a similar percentage, such as a proportion of the percentage increase. Similarly, a decrease in divided screen area size may cause a decrease in content size of the content displayed in the divided screen area.

In another example, the content size may not change but instead the amount of content shown is increased or decreased. For example, a divided screen area shows a spreadsheet. If the size of the divided screen area increases, then more columns of the spreadsheet are shown but the text size is not changed. The resizing module 102 may store settings for each application that indicate whether to automatically change the content size or to change the amount of content shown or do both. Different applications may have different settings. After the automated content re-sizing, a user may adjust the content size.

The control area management module 103 can be used to select different applications to run in the divided screen areas and to exchange data items between the different applications running in the divided screen areas. The control area management module 103 may generate and display a control area adjacent to the divided screen areas. Content, such as images, text, video, etc., may be cut or copied from an application and stored as data items and then pasted into another application. Icons or other visual identifiers of the data items may be shown in the control area, and a user may drag and drop them into different applications as needed. Also, visual identifiers (e.g., icons) for different applications currently executing in divided screen areas or operable to be selected to execute in divided screen areas may be shown in the control area. A user may drag and drop or tap an icon to execute an application in a divided screen area or change an application executed in a divided screen area.

Figure 2:
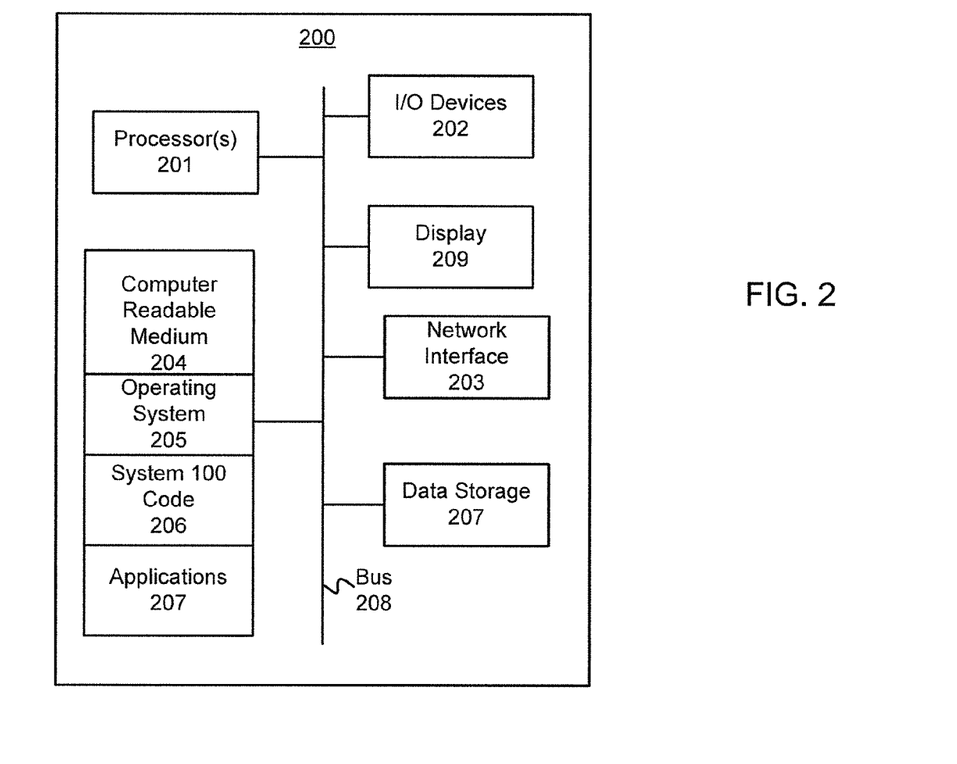
FIG. 2 illustrates a device that may be a platform for the system shown in FIG. 1.

FIG. 2 illustrates a device 200 that may run the system 100. The device 200 may store and execute the modules of the system 100. It is understood that the illustration of the device 200 is a generalized illustration and that the device 200 may include additional components and that some of the components described may be removed and/or modified.

The device 200 includes processor(s) 201, such as a central processing unit, ASIC or other type of processing circuit; input/output devices 202, such as a mouse or mouse pad, keyboard, stylus, etc., a network interface 203, to connect to a Local Area Network (LAN), a wireless 802.11x LAN, a 2G or 4G mobile Wide Area Network (WAN) or a WIMAX WAN, and a computer-readable medium 204. The device 200 includes a display 202 which has a viewing area that may be divided into divided screen areas. Each of these components may be operatively coupled to a bus 208. The computer readable medium 204 may be any suitable medium which participates in providing instructions to the processor(s) 201 for execution. For example, the computer readable medium 204 may be non-transitory or non-volatile media, such as a magnetic disk or solid-state non-volatile memory or volatile media such as RAM. The instructions stored on the computer readable medium 204 may include machine readable instructions (e.g., code) executed by the processor(s) 201 to perform the methods and functions of the system 100.

The computer readable medium 204 may store an operating system 205, such as MAC OS, MS WINDOWS, UNIX, or LINUX, and code 206 for the system 100 and applications 207 during runtime. The applications 207 may include applications that can be displayed in the divided screen areas.

The device 200 may include a data storage 207, which may include non-volatile data storage. The data storage 207 can store any data, code or applications used by the device 200.

Figure 3:
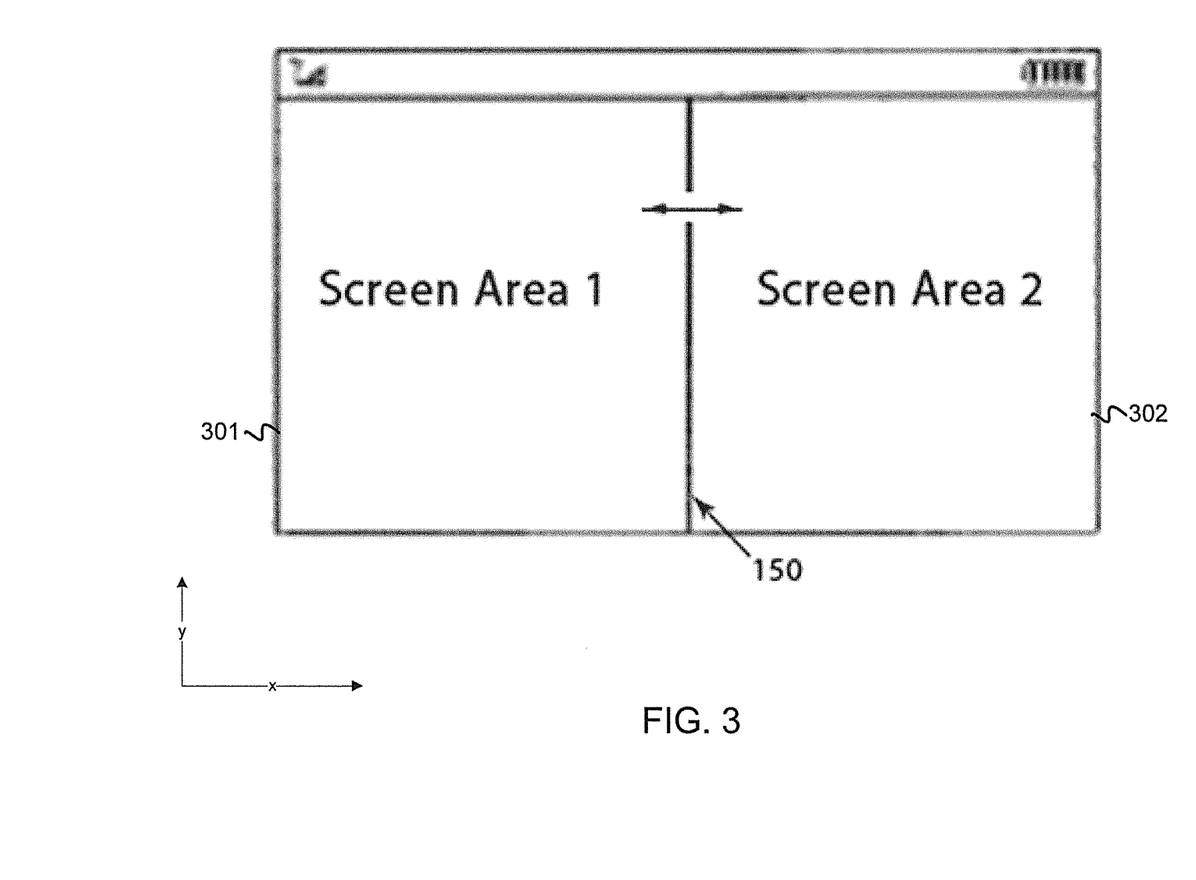
FIGS. 3-6 illustrate screenshots.

The following are examples of screen shots that may be generated by the system 100. FIG. 3 shows an example of a screen shot with two divided screen areas 301 and 302. A resizing bar 150 is shown. In this example, the divided screen areas 301 and 302 are two dimensional screen areas. The resizing bar 150 is along the y-dimension. The resizing bar 150 splits the screen area of the device along the y-dimension. The resizing bar 150 may be moved along the x-dimension, as shown by the double-headed arrow, by a user to change the size of the divided screen areas 301 and 302. In another example, the resizing bar 150 may be positioned along the x-dimension and the user can adjust the divided screen area sizes by moving the resizing bar 150 in the y-direction. The divided screen areas may be shapes other than squares or rectangles. For example, a divided screen area may be a circle or oval.

Each of the divided screen areas in the screen may be resized by adjusting the dimensions of the various divided screen areas. For example, in the 2-dimensional space of the screen, a divided screen area is resized by first determining the changes in the co-ordinates of the point of reference determined based on a specific point on the resizing bar. Based on this difference, dimensions of all of the divided screen areas on the screen are recalculated and propagated to the respective divided screen areas. This calculation and resizing is performed continuously as the user continues to move the resizing bar by touching the reference point on the bar thus providing one fluid smooth user experience and display.

Figure 4A:
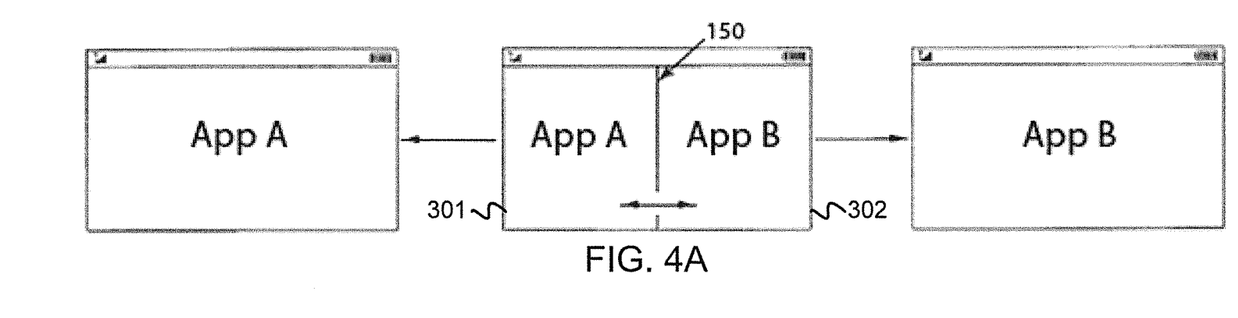
Figure 4B:
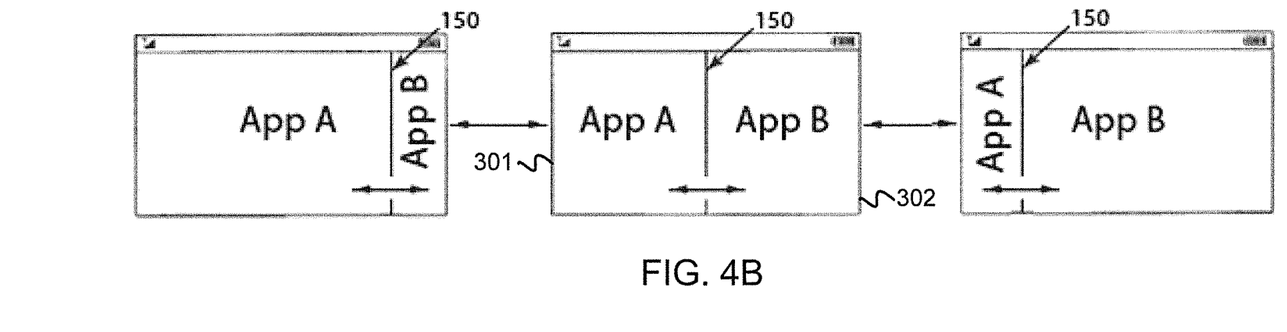

FIG. 4A shows the divided screen areas 301 and 302 displaying the applications A and B respectively. FIG. 4B shows that the resizing bar 150 may be dragged to the right to increase the size of divided screen area 301 and simultaneously decrease the size of the divided screen area 302. For example, the entire screen area of the display is used by the divided screen areas 301 and 302. As the resizing bar 150 is moved to the left, the divided screen area 301 is increased and the divided screen area 302 is simultaneously decreased by the amount the divided screen area 301 is increased. FIG. 4B also shows that if the resizing bar 150 is moved to the left, the divided screen area 301 decreases in size and the divided screen area 302 simultaneously increases in size. Amount and/or size of content shown in the divided screen areas 301 and 302 may be increased or decreased according to whether the respective dividing screen area showing the content is increased or decreased. The divided screen areas may not encompass the entire screen area of a display of a device. The sizes can be adjusted to encompass the entire screen area of the display or less than the entire screen area.

Figure 5A:
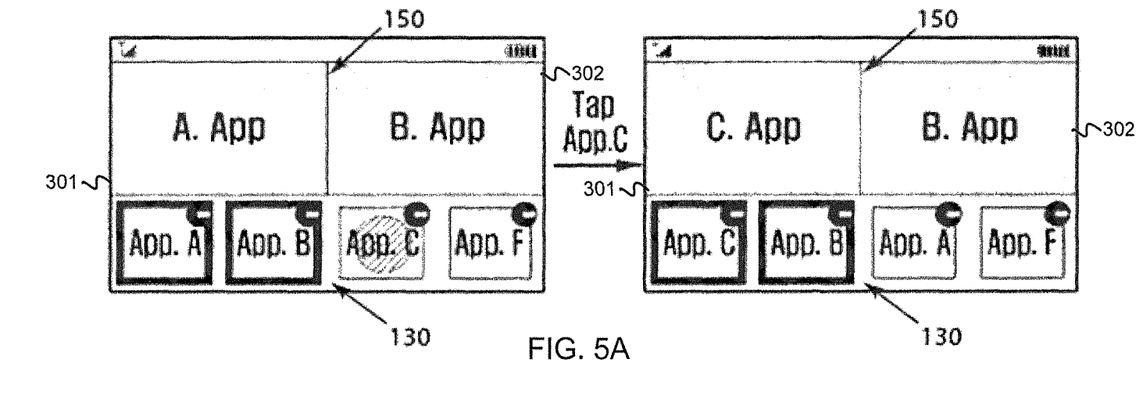
Figure 5B:
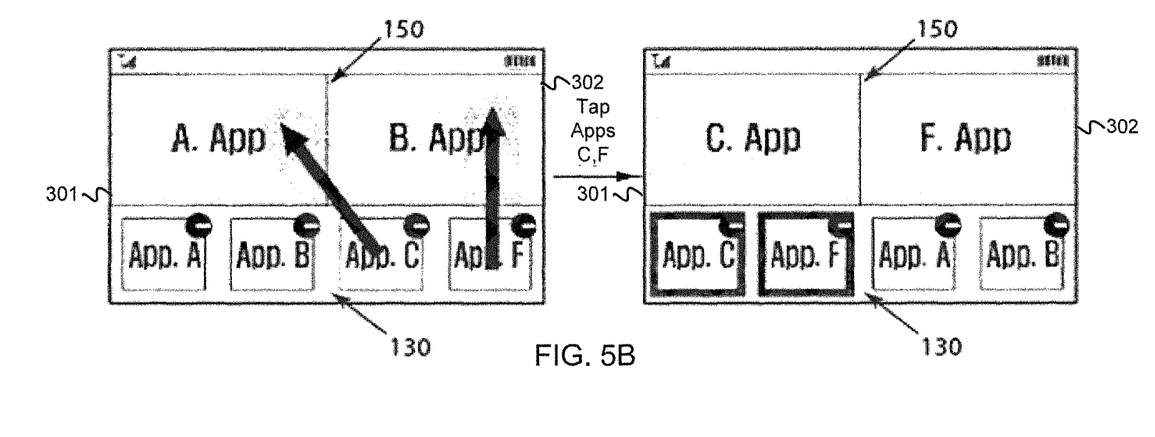

FIG. 5A shows control area 130, for example, generated by the control area management module 103. The control area 130 includes icons for applications that may be executed and displayed in the divided screen areas 301 and 302. Icons for applications currently running may be presented differently (e.g., bolded) than applications that are not currently running in a divided screen area but which may be selected to run in a divided screen area if desired. FIG. 5A shows that user input, such as a user tapping on the application C icon in the control area 130 causes the application C to run in the divided screen area 301. FIG. 5B shows that a user tapping on the application C and F icons causes the applications to run in the divided screen areas 301 and 302 respectively.

Although not shown, the resizing bar 150 may include clickable tools such as a pencil, eraser, highlighter, font, sticky note, media and lasso which can be used in the journal application and/or another application running in a divided screen area. These tools may be used for note-taking and selecting content (e.g., lassoing) to be saved and/or transferred between applications running in the divided screen areas. Also, although not shown, the control area 130 or the resizing bar 150 may display icons for data items that can be exchanged between the applications referred to as a 'pasteboard'. The data items may include content such as text, images, etc. A user may drag and drop or tap icons for the data items to cause the data items to be placed into an application or a journal.

For example, to add multiple representations of data onto the pasteboard, a dictionary is created with each representation as the value and the representation type as the key. This dictionary is then added to an array, where each item in the array represents an item. Pasteboard supports adding multiple items to it as well as adding multiple representations to each item. The items are then placed on the pasteboard with as many rows as the items in the array using a tabular representation. Thumbnail representations of the copied items are populated in these rows for users to visually identify the appropriate item to exchange between applications. The thumbnails also provide the ability to select the appropriate items to drag into the application. Once received on the new application, this item is fully expanded with the total content of the representation and removed from the tabular view as well as the array.

Figure 6:
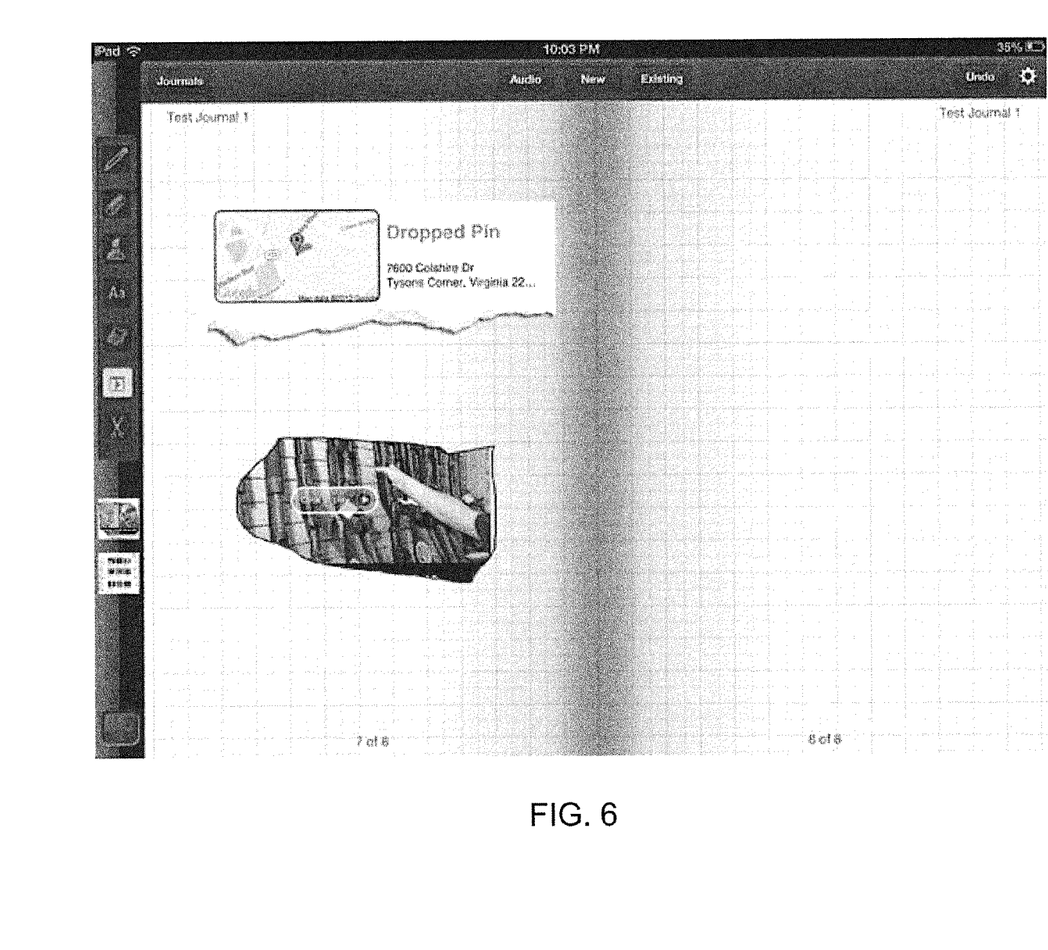

In another example, a particular location in the geolocation map application may be copied as the placemark information from the map onto the pasteboard such as shown in FIG. 6. This becomes an item in the dictionary described above. Based on the geolocation information (represented by latitude and longitude of the location), a placecard is created as a view by using the placemark region and address information. This item is represented by the thumbnail as determined by user (a pin for example such as shown in FIG. 6). Just like the items above, this item with its thumbnail and full placecard data becomes available as a data item for transfer to another application from the pasteboard. Once transferred to a different application, the complete placecard is pasted into the new application with all of its data. FIG. 6 for example is a journal with 8 pages of content. The journal includes the pin described above and video content. The resizing bar includes thumbnails or other visual indicators of the data items.

Figure 7:
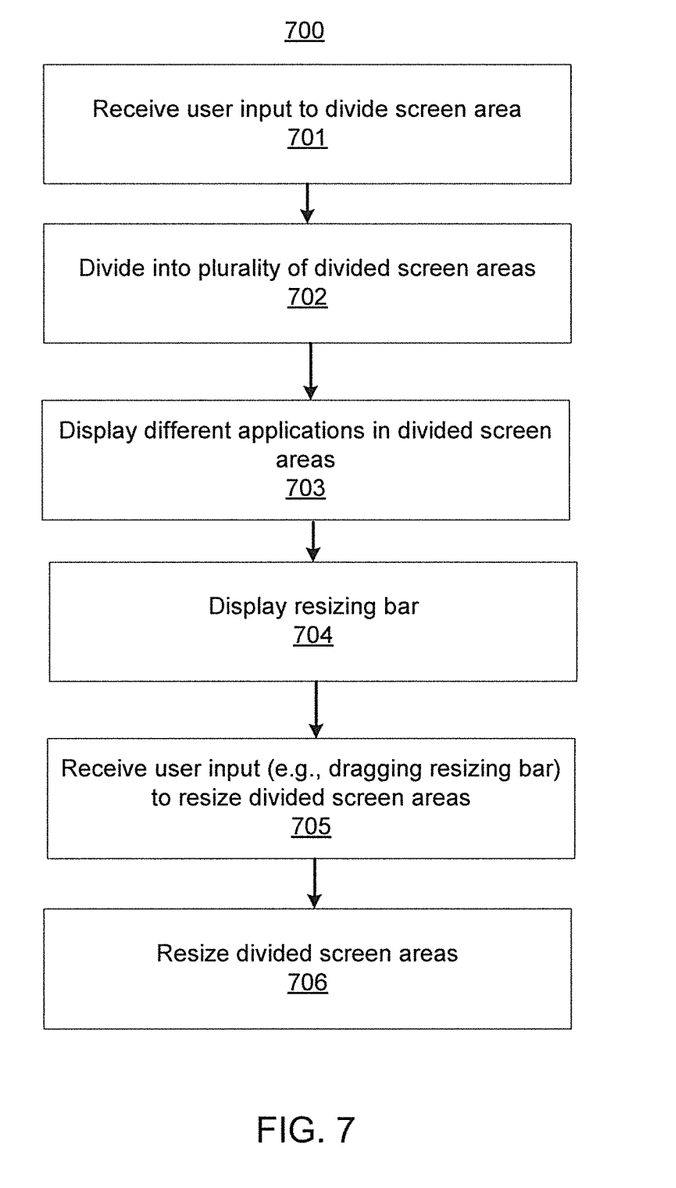
FIG. 7 illustrates a method.

FIG. 7 illustrates a flow chart of a method 700 that may be performed by the system 100 or other systems. At 701, the system 100 receives a user input to divide a screen area of a device. At 702, the system 100 divides the screen area into a plurality of divided screen areas. At 703, the system 100 displays a different application in each of the divided screen areas. The system 100 may receive a user selection of an application to run in a divided screen area and runs and displays the content for the application in the divided screen area. At 704, the system 100 displays a resizing bar between the plurality of divided screen areas. At 705, the system 100 receives a user input for example comprised of dragging the resizing bar in a direction to resize the divided screen areas.

At 705, the system 100 resizes the plurality of divided screen areas in response to the user input comprised of dragging the resizing bar. The plurality of divided screen areas may be resized simultaneously.

While the embodiments have been described with reference to examples, various modifications to the described embodiments may be made without departing from the scope of the claimed embodiments.

What is claimed is:

1. A screen area management method comprising:
   receiving a first user input to divide a screen area;
   dividing, by a processor, the screen area into a plurality of divided screen areas;
   displaying, by the processor, a resizing bar between the plurality of divided screen areas;
   receiving, by the processor, a second user input comprising dragging the resizing bar in a direction;
   resizing, by the processor, the plurality of divided screen areas in response to receiving the second user input;
   in response to resizing the plurality of divided screen areas, resizing, by the processor, content displayed in each of the plurality of divided screen areas;
   displaying, by the processor, a control area adjacent the plurality of divided screen areas, wherein the control area includes icons representing non-running applications;
   receiving, by the processor, a third user input to cause different applications of the non-running applications represented by the icons to execute in different screen areas of the divided screen areas;
   displaying, by the processor, the different applications in different screen areas of the divided screen areas, wherein icons representing running applications executing in the different screen areas are displayed in the control area differently than icons representing applications not running in the divided screen areas; and
   displaying, by the processor, a tool in the resizing bar, wherein the tool includes at least one of a pencil, an eraser, a highlighter, a font, a sticky note, media, and a lasso;
   receiving a fourth user input to cause the processor to apply the tool on at least one of the different applications in the different screen areas of the divided screen areas;
   creating a link between two of the different applications in the different screen areas of the divided screen areas, and saving the link in one of the two different applications;
   displaying, by the processor, a pasteboard in the resizing bar, wherein the pasteboard comprises information including display icons for data items to be exchanged between the different applications; and
   adding multiple representations of data from the different applications onto the pasteboard, wherein adding the multiple representations includes:
      creating a dictionary item associated with each representation of the multiple representations, the dictionary item having the associated representation as a value of the dictionary item and a type of the associated representation as a key;
      adding the dictionary item to an array, the array comprising a number of dictionary items; and
      placing the dictionary items on the displayed pasteboard, the displayed pasteboard including a number of rows equal to the number of dictionary items in the array, wherein thumbnail representations of the dictionary items are populated in the rows and are selectable to paste any of the multiple representations of data into a selected application.

2. The method of claim 1, wherein the plurality of divided screen areas are two dimensional,
the resizing bar divides the plurality of divided screen areas along a first dimension of the two dimensions, and
the second user input comprised of dragging the resizing bar in a direction further comprises dragging the resizing bar along a second dimension of the two dimensions.

3. The method of claim 2, wherein the two dimensions comprise an x dimension and a y dimension,
the resizing bar divides the plurality of divided screen areas along the y dimension, and
the second user input comprised of dragging the resizing bar in a direction further comprises dragging the resizing bar along the x dimension.

4. The method of claim 1, wherein resizing the content comprises:
for at least one of the plurality of divided screen areas, increasing or decreasing a size of the content displayed in the divided screen area based on an amount of increase or decrease in size of the divided screen area responsive to the second user input comprised of dragging the resizing bar.

5. The method of claim 1, wherein resizing the content further comprises:
for at least one of the plurality of divided screen areas, increasing or decreasing an amount of the content displayed in the divided screen area based on an amount of increase or decrease in size of the divided screen area responsive to the second user input comprised of dragging the resizing bar, wherein a size of the content is not increased or decreased.

6. The method of claim 1, comprising:
communicating data items between the applications in the plurality of divided screen areas using at least one of the control area the pasteboard in the resizing bar.

7. The method of claim 6, wherein communicating data items comprises:
receiving the data items from at least one of the applications running in the plurality of divided screen areas;
storing the data items;
presenting an indicator for each of the data items in the control area or the resizing bar;
receiving a selection of at least one of the indicators and a fifth user input indicative of one of the applications to receive at least one of the data items associated with the selected at least one indicator; and
transferring the at least one data item to the application.

8. The method of claim 1, comprising:
at least one of inserting, searching, copying, moving, and creating data items to exchange between the applications in the plurality of divided screen areas using the control area.

9. The method of claim 1, wherein the first application is a journal application and the second application is a map application, and wherein creating the link between the two different applications includes:
receiving a fifth user input to store a link to a location shown in the map application in the journal application; and
receiving a sixth user input to select the stored link and to call the map application to display the location.

10. A screen management system comprising:
an input/output device;
a display device;
a processor; and
a computer readable medium comprising instructions executed by the processor to:
receive, on the input/output device, a first user input to divide a screen area and divide the screen area into a plurality of divided screen areas;
display a resizing bar between the plurality of divided screen areas, receive a second user input comprising dragging the resizing bar in a direction, resize the plurality of divided screen areas in response to the second user input, and resize content displayed in each of the plurality of divided screen areas;
display, on the display device, a control area adjacent the plurality of divided screen areas, wherein the control area includes icons representing non-running applications;
receive a third user input to cause different applications of the non-running applications represented by the icons to execute in different screen areas of the divided screen areas;
display the different applications in different screen areas of the divided screen areas, wherein icons representing running applications executing in the different screen areas are displayed in the control area differently than icons representing applications not running in the divided screen areas;
display at least one tool in the resizing bar, wherein the tool includes at least one of a pencil, an eraser, a highlighter, a font, a sticky note, media, and a lasso;
receive a fourth user input to apply the tool on at least one of the different applications in the different screen areas of the divided screen areas;
create a link between two of the different applications in the different screen areas of the divided screen areas, and saving the link in one of the two different applications;
display a pasteboard in the resizing bar, wherein the pasteboard comprises information including display icons for data items to be exchanged between the different applications; and
add multiple representations of data from the different applications onto the pasteboard, wherein to add the multiple representations, the processor is to:
create a dictionary item associated with each representation of the multiple representations, the dictionary item having the associated representation as a value of the dictionary item and a type of the associated representation as a key;
add the dictionary item to an array, the array comprising a number of dictionary items; and
place the dictionary items on the displayed pasteboard, the displayed pasteboard including a number of rows equal to the number of dictionary items in the array, wherein thumbnail representations of the dictionary items are populated in the rows and are selectable to paste any of the multiple representations of data into a selected application.

11. The system of claim 10, wherein the plurality of divided screen areas are two dimensional,
the resizing bar divides the plurality of divided screen areas along a first dimension of the two dimensions, and the second user input comprised of dragging the resizing bar in a direction further comprises dragging the resizing bar along a second dimension of the two dimensions.

12. The system of claim 10, wherein the processor is to resize the content shown in the divided screen areas based on an amount of increase or decrease in size of the divided screen areas responsive to the second user input comprised of dragging the resizing bar.

13. The system of claim 10, wherein the processor is to increase or decrease an amount of the content shown in the divided screen areas based on an amount of increase or decrease in size of the divided screen areas responsive to the second user input comprised of dragging the resizing bar.

14. The system of claim 10, wherein the control area management module is further to communicate data items between the applications in the plurality of divided screen areas using the control area or the resizing bar.

15. The system of claim 14, wherein to communicate data items between the applications in the plurality of divided screen areas, the control area management module:
receives the data items from at least one of the applications running in the plurality of divided screen areas;
stores the data items;
presents an indicator for each of the data items in at least one of the control area and the resizing bar;
receives a selection of at least one of the indicators and a fifth user input indicative of one of the applications to receive at least one of the data items associated with the selected at least one indicator; and
transfers the at least one data item to the application.

16. The system of claim 14, wherein to communicate data items between the applications in the plurality of divided screen areas, the control area management module uses the control area to:
at least one of insert, search, copy, move, and create data items to exchange between the applications in the plurality of divided screen areas.

17. The system of claim 10, wherein the first application is a journal application and the second application is a map application, and wherein the instructions executed by the processor to create the link between the first application and the second application are to cause the processor to:
receive a fifth user input to store a link to a location shown in the map application in the journal application; and
receive a sixth user input to select the stored link and to call the map application to display the location.

18. A non-transitory computer readable medium including machine readable instructions executable by a processor to:
receive a first user input to divide a screen area;
divide the screen area into a plurality of divided screen areas;
display a resizing bar between the plurality of divided screen areas;
receive a second user input comprised of dragging the resizing bar in a direction;
resize the plurality of divided screen areas in response to the second user input comprised of dragging the resizing bar;
in response to resizing the plurality of divided screen areas, resize content displayed in each of the plurality of divided screen areas;
display a control area adjacent the plurality of divided screen areas, wherein the control area includes icons representing non-running applications;
receive a third user input to cause different applications of the non-running applications represented by the icons to execute in different screen areas of the divided screen areas;
display the different applications in different screen areas of the divided screen areas, wherein icons representing running applications executing in the different screen areas are displayed in the control area differently than icons representing applications not running in the divided screen areas;
display at least one tool in the resizing bar, wherein the tool includes at least one of a pencil, an eraser, a highlighter, a font, a sticky note, media, and a lasso;
receive a fourth user input to apply the tool on at least one of the different applications in the different screen areas of the divided screen areas;
create a link between two of the different applications in the different screen areas of the divided screen areas, and saving the link in one of the two different applications;
display a pasteboard in the resizing bar, wherein the pasteboard comprises information including display icons for data items to be exchanged between the different applications; and
add multiple representations of data from the different applications onto the pasteboard, wherein to add the multiple representations, the processor is to:
create a dictionary item associated with each representation of the multiple representations, the dictionary item having the associated representation as a value of the dictionary item and a type of the associated representation as a key;
add the dictionary item to an array, the array comprising a number of dictionary items; and
place the dictionary items on the displayed pasteboard, the displayed pasteboard including a number of rows equal to the number of dictionary items in the array, wherein thumbnail representations of the dictionary items are populated in the rows and are selectable to paste any of the multiple representations of data into a selected application.

19. The non-transitory computer readable medium of claim 18, wherein the plurality of divided screen areas are two dimensional, and
the resizing bar divides the plurality of divided screen areas along a first dimension of the two dimensions, and
the second user input comprised of dragging the resizing bar in a direction comprises dragging the resizing bar along a second dimension of the two dimensions.

20. The non-transitory computer readable medium of claim 18, wherein the first application is a journal application and the second application is a map application, and wherein the machine readable instructions, executable by the processor to create the link between the first application and the second application, are to cause the processor to:
receive a fifth user input to store a link to a location shown in the map application in the journal application, wherein the location is copied as the information in the pasteboard and becomes a dictionary item; and
receive a sixth user input to select the stored link and to call the map application to display the location.

* * * * *